United States Patent
Koffi et al.

(10) Patent No.: US 6,775,895 B2
(45) Date of Patent: Aug. 17, 2004

(54) OPTIMIZED METHOD FOR ASSEMBLING TWO SUBSTANTIALLY PLANAR PARTS

(75) Inventors: Konan Koffi, Abidjan (CI); Jacques Huet, Muret (FR); Eric Bouchet, Aussonne (FR)

(73) Assignee: Airbus France, Toulouse Cedex (FR)

( * ) Notice: Subject to any disclaimer, the term of this patent is extended or adjusted under 35 U.S.C. 154(b) by 193 days.

(21) Appl. No.: 10/182,052

(22) PCT Filed: Dec. 6, 2001

(86) PCT No.: PCT/FR01/03854
§ 371 (c)(1),
(2), (4) Date: Jul. 25, 2002

(87) PCT Pub. No.: WO02/46625
PCT Pub. Date: Jun. 13, 2002

(65) Prior Publication Data
US 2004/0094669 A1 May 20, 2004

(30) Foreign Application Priority Data
Dec. 8, 2000 (FR) .......................................... 00 15982

(51) Int. Cl.⁷ .......................... B23Q 17/00; B21D 39/00
(52) U.S. Cl. .................. 29/407.08; 29/407.1; 29/897.2; 29/524.1; 29/525.06; 29/525.02
(58) Field of Search .......................... 29/897.2, 407.09, 29/407.1, 407.05, 407.08, 524.1, 525.06, 525.02

(56) References Cited

U.S. PATENT DOCUMENTS 2,639,788 A  *  5/1953  Gustafson et al. ............. 52/463
4,579,475 A      4/1986  Hart-Smith et al.
5,518,208 A  *  5/1996  Roseburg ..................... 244/132
6,105,902 A      8/2000  Petit
6,317,954 B1 * 11/2001 Cunningham et al. ..... 29/407.1

FOREIGN PATENT DOCUMENTS

DE       42 34038 A1     4/1994
DE       197 02518 A1    6/1997

OTHER PUBLICATIONS

Chen, et al., "A methodology for fatigue crack growth and residual strength prediction with applications to aircraft fuelages", Computational Mechanics, vol. 19, pp. 527–532 (1997).

* cited by examiner

Primary Examiner—David P. Bryant
(74) Attorney, Agent, or Firm—Burns, Doane, Swecker & Mathis, L.L.P.

(57) ABSTRACT

Optimized method for assembling two substantially flat parts.

To assemble two parts (10, 12) that are substantially flat using fixations (14) such as rivets or bolts, first the ratio R is calculated between tensile and bending stresses relating to the forces to be transmitted. The end line of the fixations (14) is then oriented along an angle $\alpha$ whose absolute value is such that $10.8 \ln(R)+16 < |\alpha| < 13.9 \ln(R)+28$ when the ratio R is 1 or more, and such that $16° < |\alpha| < 28°$ when the ratio R is less than 1. The absolute value of angle $\alpha$ does not exceed 90°.

11 Claims, 3 Drawing Sheets

OPTIMIZED METHOD FOR ASSEMBLING TWO SUBSTANTIALLY PLANAR PARTS

TECHNICAL FIELD

The invention concerns a method for assembling two flat or substantially flat parts, such as plates or sections, by means of fixations such as bolts, rivets etc.

More precisely, the invention relates to the optimised assembly of two parts designed to bear and transmit predetermined forces, either uniform or varying in time, which may differ from one assembly to another.

The method according to the invention applies to all assemblies of substantially flat parts, whether metallic or in composite material, which use fixations such as rivets or bolts. It finds particularly advantageous use in aeronautics, in which this type of assembly is widely used.

PRIOR ART

In an aircraft, bolted or riveted assembly is the most frequently used assembly mode. A passenger transport or cargo aircraft comprises more than one million rivets and close to 300000 bolts.

In assemblies of this type, fixations perform the functions of force transfer, sealing and the transmission of static electricity current and lightening.

The design of assemblies using bolts and rivets is therefore vital for the performance of the entire structure of the aircraft. Any poor design, would lead to a limited lifetime and weight excess.

In the current state of the art, the positioning of rivets and bolts is made according to the usual practice of each aircraft builder without having true recourse to any particular methodology.

DESCRIPTION OF THE INVENTION

The subject of the invention is precisely a method for assembling two substantially flat parts, metallic or in composite material, aimed at optimising the positioning of the fixations used to produce this assembly, so as to guarantee controlled, optimum lifetime.

In accordance with the invention, this result is obtained by means of a method for assembling two substantially flat parts, using at least one end line of fixations intended to transmit determined forces between said parts, and oriented in the plane of the parts, characterized in that it consists of calculating a ratio R between the tensile stresses $\sigma_T$ and bending stresses $\sigma_F$ relating to said forces, and of orienting said end line of fixations along an angle $\alpha$ relative to the direction of the neutral fibre of said parts, the absolute value of said angle $\alpha$ being such that: $10.8 \ln (R)+16 <|\alpha|<13.9 \ln (R)+28$ when the ratio R is at least 1, and such that $16<|\alpha|<28$ when the ratio R is less than 1, the absolute value of angle $\alpha$ being no more than 90°.

The applicant has established by test-supported numeric simulations, that by positioning the first line of fixations along a direction $\alpha$ paying heed to the above-defined range of values, it is possible to better distribute the stresses borne by each of said fixations, and consequently to increase the lifetime of the assemblies in respect of fatigue and static resistance.

Under one preferred embodiment of the invention, the end line of fixations is oriented along an angle $\alpha$ substantially equal in absolute value to $11.6 \ln (R)+21$ when the ratio R is at least 1, and substantially equal to 20° when the ratio R is less than 1.

If the forces to be transmitted are alternate forces, the end line of fixations is advantageously oriented along the above-mentioned angle $\alpha$ and along an angle $-\alpha$, either side of the neutral fibre of the parts. The fixation furthest in front is then on the neutral fibre.

The assembly method of the invention may be used both when parts are assembled directly one to the other and when they are assembled via one or two fishplates.

In the former case, the two parts are directly assembled one to another by at least two end lines of fixations oriented along angle $\alpha$.

In the latter case, that is to say when the two parts are assembled one to another via a fishplate, each of the parts is fixed to the fishplate by at least two end lines of fixations. Advantageously, these end lines are then oriented along angle $\alpha$. As a variant, at least the end lines the furthest away from the other part are oriented along angle $\alpha$.

In the third case, that is to say when the two parts are assembled one to the other via two fishplates, each of the parts is fixed to the two fishplates by at least two end lines of fixations, among which at least the end line the most distant from the other part is oriented along angle $\alpha$.

The invention applies both to parts having a substantially constant thickness in the assembly zone and to parts whose thickness tapers towards the ends in the above-cited zone.

SHORT DESCRIPTION OF THE DRAWINGS

As limitative examples, different embodiments of the invention are described below with reference to the appended drawings in which.

DETAILED DESCRIPTION OF PREFERRED EMBODIMENTS OF THE INVENTION

Figure 1:
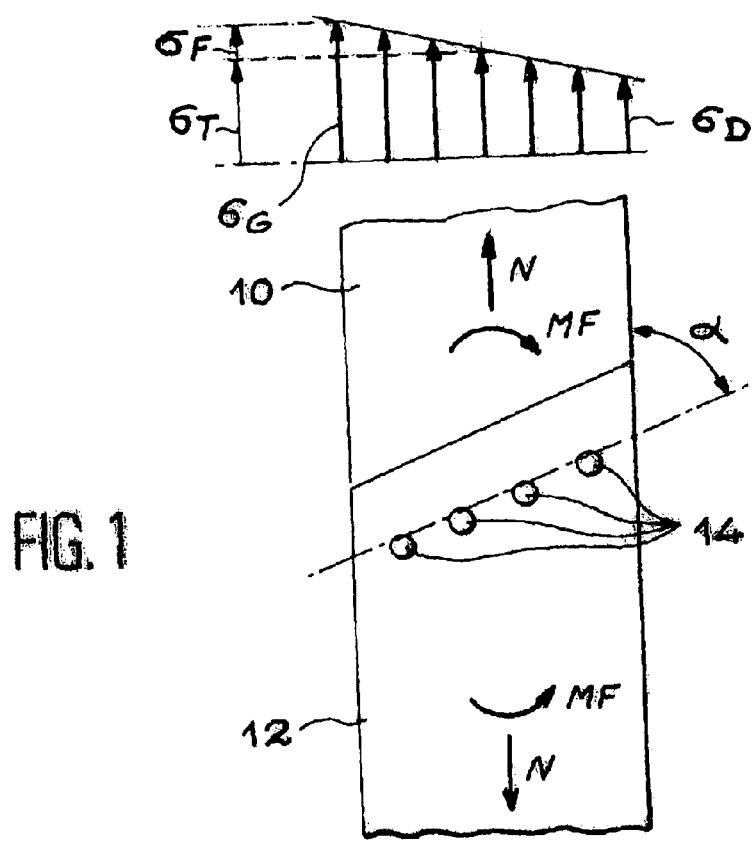
FIG. 1 is an overhead view giving a diagram of an assembly by rivets or bolts using the method of the invention.

As schematically shown in FIG. 1, the invention concerns the assembly of two parts 10, 12 by means of a plurality of fixations 14, generally formed of rivets or bolts. The two parts 10 and 12 so assembled may be made up of any substantially flat parts. By "substantially flat parts" is meant here, as in the remainder of the disclosure, any parts such as plates or sections having a flat or close to flat geometry.

The method of the invention concerns the assembly of parts 10 and 12 which, along their plane, are intended to undergo forces or predetermined loads during subsequent use. These forces may be of different types depending upon the application concerned. In particular, the forces applied to the parts may be wave forces always in the same direction or alternate (that is to say alternately in one direction, then in the other). The particular case of alternate forces will be treated below with reference to FIG. 4.

Irrespective of the forces applied to the parts, for each case it is possible to determine a tensile stress $\sigma_T$ corresponding to the tensile force N (FIG. 1) able to be applied between the parts along their neutral fibre, and a bending stress $\sigma_F$ corresponding to the bending moment $M_F$ (FIG. 1) able to be applied between the parts.

As shown by the stress profile illustrated in the top part of FIG. 1, if the stresses borne by each of the assembly sides (left (G) and right (D) respectively in the figure) are designated $\sigma_G$ and $\sigma_D$, the tensile stress $\sigma_T$ equals $$\frac{\sigma_G + \sigma_D}{2}$$

and the bending stress $\sigma_F$ equals $$\frac{\sigma_G - \sigma_D}{2}$$

According to the invention, the ratio R between the tensile stress $\sigma_T$ and the bending stress $\sigma_F$ is determined by calculation. In most applications, the ratio R varies between a minimum value Rmin and a maximum value Rmax. In some cases, the ratio R may however have a substantially constant value.

On the basis of the R ratio determined in this manner, the value of an angle $\alpha$ (FIG. 1) is fixed between a first line of fixations 14 and the direction of the neutral fibre of parts 10 and 12 to be assembled. For this purpose, the curves in FIG. 2 are used which respectively show the maximum $\alpha_{max}$, minimum $\alpha_{min}$ and optimal values $\alpha_{opt}$ of angle $\alpha$ in relation to ratio R.

Figure 2:
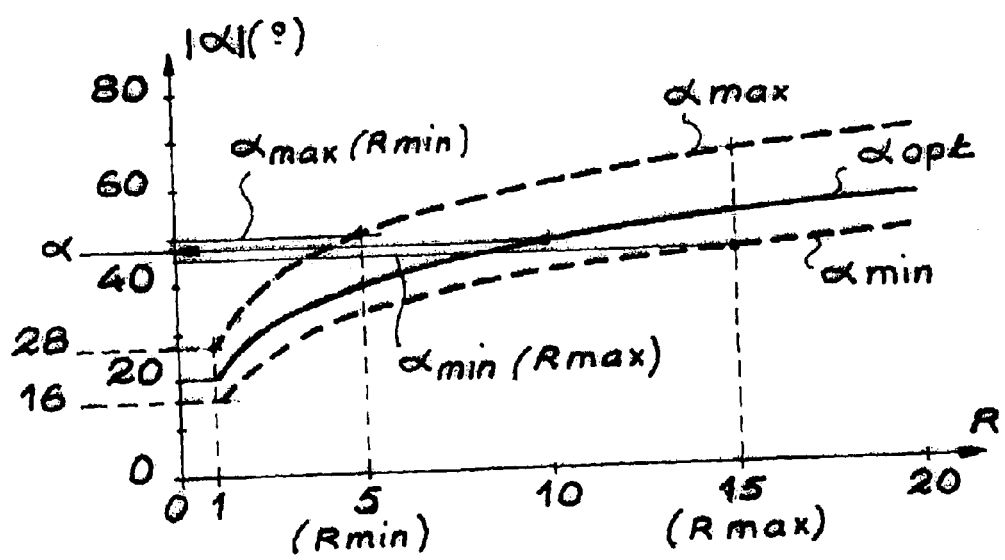
FIG. 2 is a curve showing changes in angle $\alpha$, formed by the first line of rivets or bolts with the neutral fibre of the parts, relative to the ratio R between the tensile stress $\sigma_T$ and the bending stress $\sigma_F$ according to the invention.

When the ratio R is 1 or more, the maximum value of angle $\alpha$, which corresponds to the curve $\alpha_{max}$ in FIG. 2, is given by the relationship $\alpha_{max}=13.9 \ln(R)+28$. Under the same conditions, the minimum value of angle $\alpha$, which corresponds to the curve $\alpha_{min}$, is given by the relationship $\alpha_{min}=10.8 \ln(R)+16$. Finally, still in cases when the ratio R is 1 or more, the optimal value of angle $\alpha$, which corresponds to the curve $\alpha_{opt}$ in FIG. 2, is given by the relationship $\alpha_{opt}=11.6 \ln(R)+21$.

When the ratio R is less than 1, the optimal value of angle $\alpha$ is approximately 20°, the maximum and minimum values then being 28° and 16° respectively. All these values also correspond to those given by the curves in FIG. 2.

In the more general case when R varies between two values Rmin and Rmax (these values are respectively 5 and 15 in the numeric example illustrated in FIG. 2), the value chosen for angle $\alpha$ must be such that $\alpha_{min}$, (Rmax) $\leq \alpha \leq \alpha_{max}$ (Rmin). In practice, a value for $\alpha$ is chosen lying substantially midway between these two terminals, that is to say that $\alpha$ is given a value that is substantially equal to $$\frac{\alpha_{\min}(R\max) + \alpha_{\max}(R\min)}{2}.$$

Advantageously, if the ratio R is more or less constant, angle $\alpha$ is given a value substantially corresponding to the value given by the curve $\alpha_{opt}$ for this value of R.

It is to be noted that the value given to angle $\alpha$ never exceeds 90°. Therefore, in the eextreme case in which the forces to be transmitted by the assembly relate to simple tensile forces, angle $\alpha$ is preferably given a value of 90°, the minimum value, in this case, being 80°.

When angle $\alpha$ is given the optimal value $\alpha_{opt}$ the end lines of fixations 14 oriented along this angle are arranged in optimal manner, such that the fixations of these lines are isocritical. The stresses borne by fixations 14 carrying the greatest load are then minimal. This characteristic can therefore impart an optimal value to fatigue lifetime. This characteristic also optimises static resistance. These properties subsist for as long as the value of angle $\alpha$ remains within the range delimited by angles $\alpha_{max}$ and $\alpha_{min}$.

The arrangement of the end lines of fixations 14 according to the invention applies irrespective of assembly type.

Figure 3A:
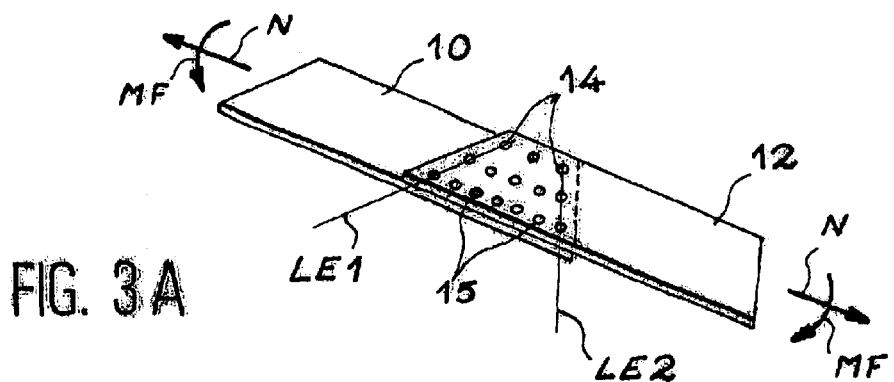
FIGS. 3A to 3D are perspective views which illustrate different applications of the invention to assemblies with no fishplate, with one fishplate and with two fishplates respectively.

Therefore, FIG. 3A shows the case of a simple assembly, in which the two parts 10 and 12 to be assembled are directly fixed one to the other without any fishplate.

The substantially flat ends of parts 10 and 12 then overlap so as to be assembled one to the other by two end lines LE1 and LE2 of fixations 14. As illustrated by way of example in FIG. 3A, the assembly generally also comprises intermediate fixations 15. In this type of assembly, the end lines LE1 and LE2 are oriented along angle $\alpha$ in accordance with the invention. Also, fixations 14 and 15 are generally aligned in a certain number of rows oriented parallel to the neutral fibre of parts 10 and 12. The number and arrangement of intermediate fixations 15 are determined in accordance with rules of the art.

Figure 3B:
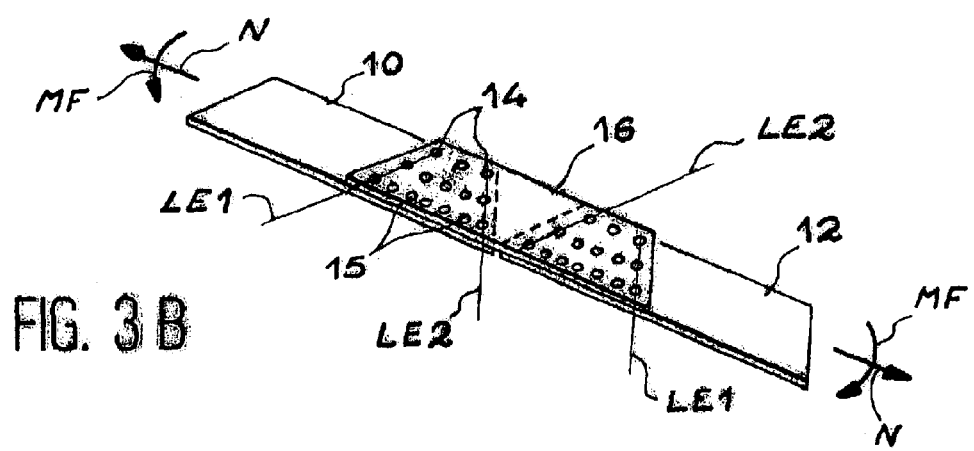

FIG. 3B shows a first application of the invention to the assembly of two parts 10 and 12 via a fishplate 16.

In this case, each of parts 10 and 12 is fixed to fishplate 16 by an assembly comparable to the one which joins parts 10 and 12 in the application shown in FIG. 3A. In other words, parts 10 and 12 are placed end to end and the fishplate 16 covers the end of each part, being fixed to these ends by two end lines LE1 and LE2 of fixations 14 and by intermediate fixations 15. As in the previous case, the number and the arrangement of intermediate fixations 15 are determined in conventional manner using the rules of the art.

Figure 3C:
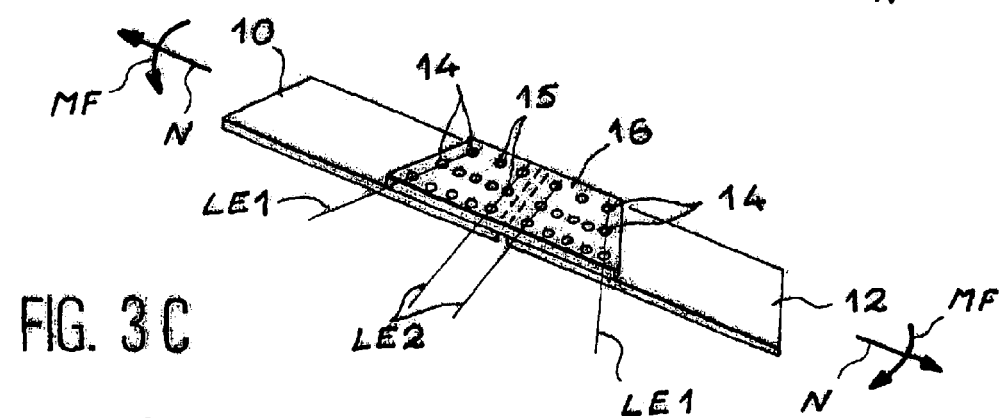

FIG. 3C also concerns the assembly of two parts 10 and 12 by means of a fishplate 16.

As in the preceding case, fishplate 16 is directly fixed to each of parts 10 and 12 by two end lines LE1 and LE2 of fixations 14 and by intermediate fixations 15. In this case, however, only the end lines LE1 the most distant from the other part are oriented along angle $\alpha$ in accordance with the invention. On the contrary, the end lines LE2 the nearest to the other part are oriented along an angle close to 90° relative to the neutral fibre of the two parts.

In this case, the fishplate 16 must be thickened in the zone of lines LE2 which are critical sites for the onset of cracks.

Figure 3D:
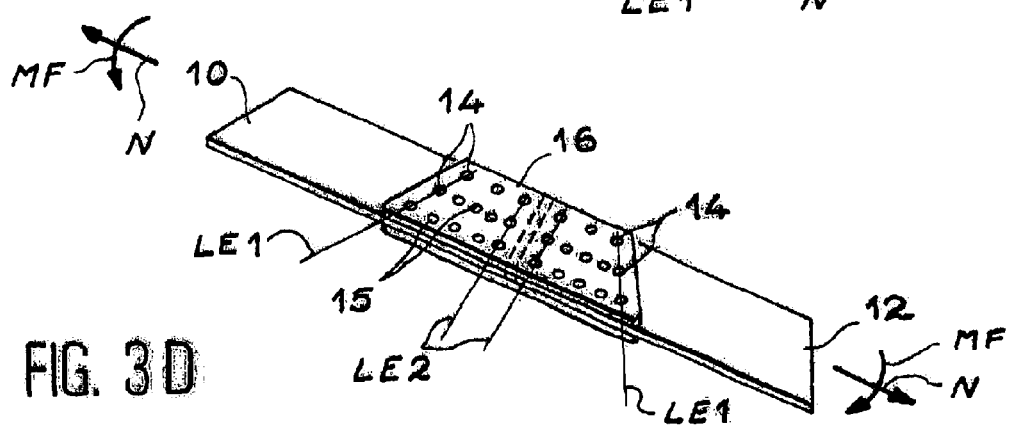

FIG. 3D shows the case in which parts 10 and 12 are assembled by means of two fishplates 16, positioned either side of the ends of the parts. The two fishplates 16 are then joined separately to the end of each of parts 10 and 12, said parts being arranged end to end as in FIGS. 3B and 3C. As in the case shown in FIG. 3C, the joining of the fishplate to each of the parts is ensured by two end lines LE1 and LE2 and by at least one intermediate line L1 of fixations 14, and only the end line LE1 the most distant from the other part is oriented along angle a according to the invention.

In the case just described with reference to FIG. 3D, in which parts 10 and 12 are assembled one to the other by two fishplates 16, the thickness of each fishplate is substantially 0.6 times the thickness of the single fishplate used for the case shown in FIG. 3B.

As illustrated by FIGS. 3A to 3D, the ends of parts 10 and 12 and of fishplates 16 if used, are advantageously cut parallel to end lines LE1 and LE2 of fixations 14. With this arrangement, it is possible to limit the weight of parts to minimal values.

In FIGS. 3A to 3D, the ends of parts 10 and 12 used for their assembly are of uniform thickness corresponding to the thickness of said parts outside the assembly zone. However, other arrangements are possible while remaining within the scope of the invention. Therefore the ends of parts 10 and 12 may also be of varying thickness which decreases either regularly in tapered manner or in stages towards the end of the corresponding part.

Figure 4:
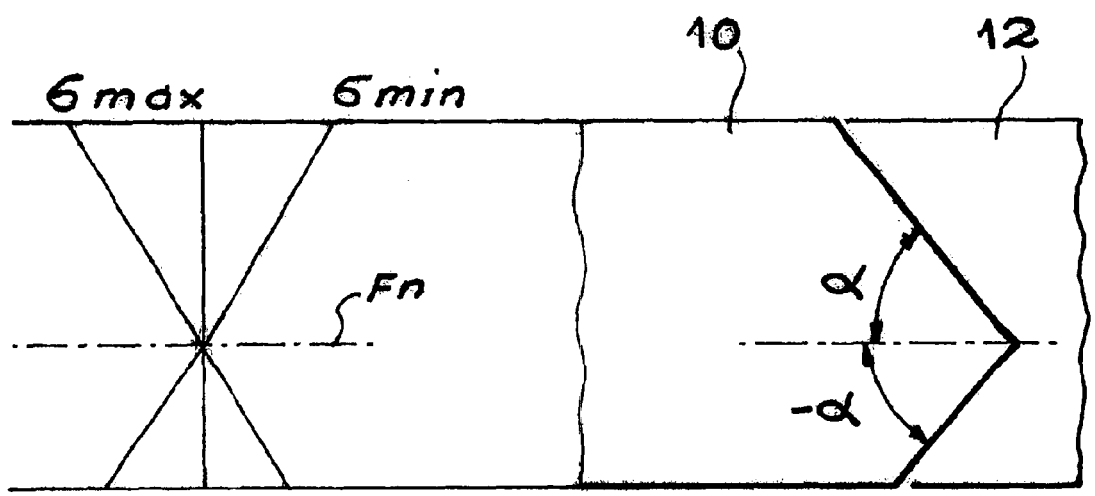
FIG. 4 is an overhead view comparable to FIG. 1, illustrating the particular case in which the forces applied to the assembly are alternate forces.

As shown schematically in FIG. 4 and as previously mentioned, the invention also applies to cases in which the forces which must be transmitted by the assembly are alternate forces, that is to say forces alternately oriented in one direction and then in the other. These alternate forces may in particular be bending forces and/or tensile forces. In this case, the end line formed by fixations 14 is oriented along angle α on one side of the neutral fibre of parts 10 and 12, and along an angle −α on the other side of said neutral fibre.

The invention is evidently not limited to the embodiments just described. It may be applied to parts made in identical or different materials, in metallic or composite materials. It may also be applied both to parts that are substantially flat and to sections assembled via their substantially flat cores.

What is claimed is:

1. Method for assembling two substantially flat parts by means of at least one end line of fixations intended to transmit determined forces between said parts and oriented along the plane of the parts, in which said method consists of calculating at least one ratio R between the tensile stresses $s_T$ and bending stresses $s_F$ relating to said forces, and of orienting said end line of fixations along an angle α relative to the direction of the neutral fibre of said parts, the absolute value of said angle α being such that: $\alpha_{min} < |\alpha| < \alpha_{max}$ where $\alpha_{min} = 10.8 \ln(R) + 16$ and $\alpha_{max} = 13.9 \ln(R) + 28$ when the ratio R is 1 or more, and in which $\alpha_{min} = 16$ and $\alpha_{max} = 28$ when the ratio R is less than 1, the absolute value of angle α being no more than 90°.

2. Method according to claim 1, in which when the ratio R varies between a minimal value Rmin and a maximum value Rmax, said end line of fixations is oriented along an angle α whose absolute value is such that $\alpha_{min}$ (Rmax) $\leq |\alpha| \alpha_{max}$ (Rmin).

3. Method according to claim 2, in which the absolute value of angle α is given a value substantially equal to $$\frac{\alpha_{min}(R\text{max}) + \alpha_{max}(R\text{min})}{2}.$$

4. Method according to claim 1 in which, when the ratio R is more or less constant, said end line of fixations is oriented along an angle a substantially equal, in absolute value, to $\alpha_{opt}$ in which $\alpha_{opt} = 11.6 \ln(R) + 21$ when $\alpha_{opt}$ is 1 or more and with $\alpha_{opt} = 20°$ when R is less than 1.

5. Method according to claim 1, in which the forces to be transmitted being alternate forces, the end line of fixations is oriented along said angle α and along an angle α either side of the neutral fibre of parts.

6. Method according to claim 1, in which the two parts are assembled directly one to the other by at least two end lines of fixations oriented along said angle α.

7. Method according to claim 1, in which the two parts are assembled one to the other via a fishplate, each of the parts being fixed to the fishplate by at least two end lines of fixations oriented along said angle α.

8. Method according to claim 1, in which the two parts are assembled one to the other via a fishplate, each of the parts being fixed to the fishplate by at least two end lines of fixations, at least the end lines the most distant from the other part being oriented along said angle α.

9. Method according to claim 1, in which said parts are assembled one to the other via two fishplates, each of the parts being fixed to the two fishplates by at least two end lines of fixations, among which at least the end line the most distant from the other part is oriented along said angle α.

10. Method according to claim 1, in which the thickness of said parts is substantially constant in the assembly zone.

11. Method according to claim 1, in which the thickness of said parts decreases towards their ends, in the assembly zone.

* * * * *